C. L. LILLEBERG.
LAND ROLLING MACHINE.
APPLICATION FILED NOV. 28, 1910.
1,017,430.
Patented Feb. 13, 1912.
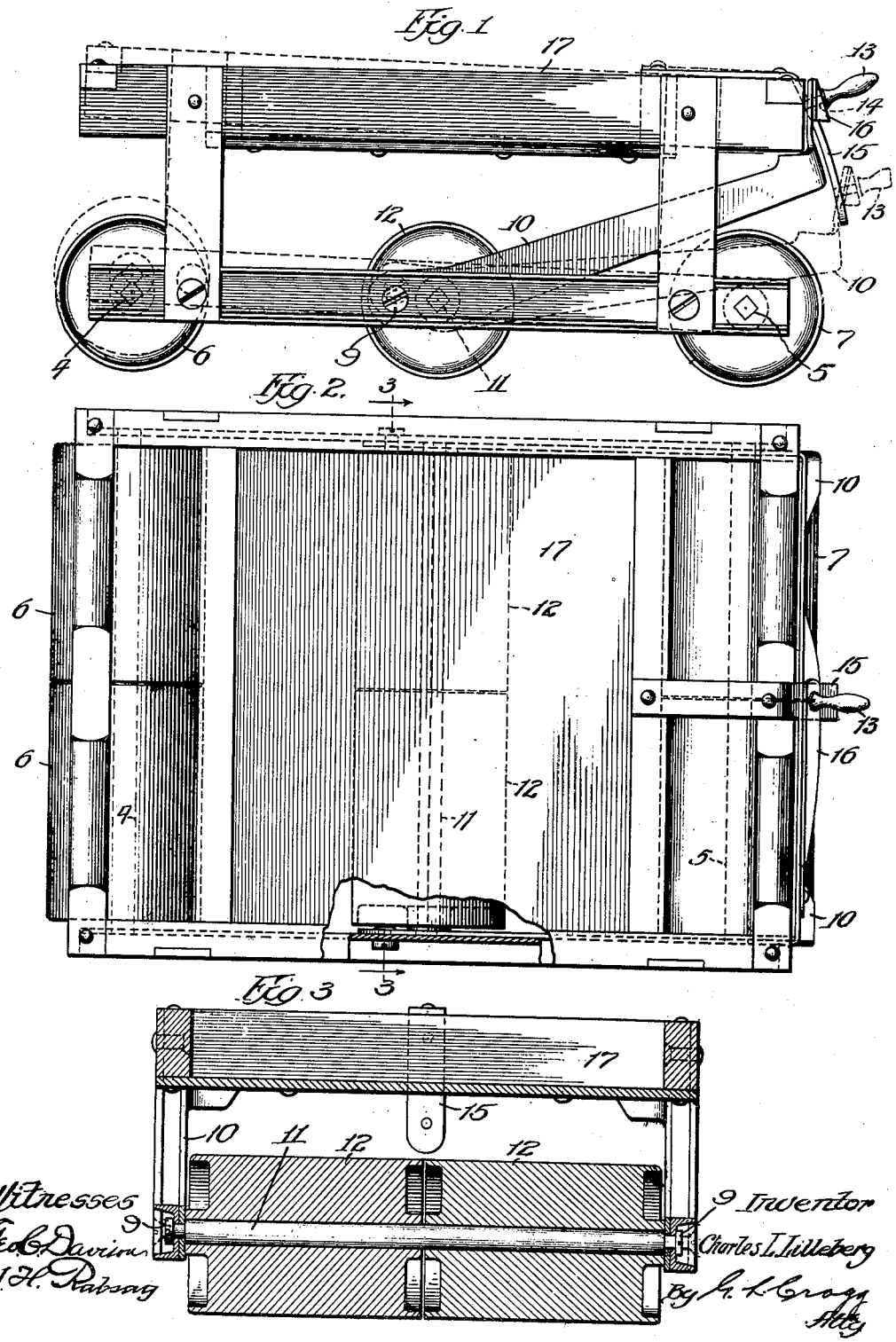

UNITED STATES PATENT OFFICE.

CHARLES L. LILLEBERG, OF CHICAGO, ILLINOIS.

LAND-ROLLING MACHINE.

1,017,430. Specification of Letters Patent. Patented Feb. 13, 1912.

Application filed November 28, 1910. Serial No. 594,488.

*To all whom it may concern:*

Be it known that I, CHARLES L. LILLEBERG, citizen of the United States, residing at Chicago, in the county of Cook and State of Illinois, have invented a certain new and useful Improvement in Land-Rolling Machines, of which the following is a full, clear, concise, and exact description, reference being had to the accompanying drawings, forming a part of this specification.

My invention relates to land rolling machines and broadly speaking includes a minimum number of three land rolling rollers arranged in tandem and adapted simultaneously to turn and operate on the ground, the structure being such that the axes of the three rollers are maintained in substantially fixed relation during the normal operation of the machine with results that will be made apparent when the invention has been further described in connection with one of many possible embodiments thereof shown in the accompanying drawing, in which—

Figure 1 is a side view of the machine, certain parts being dotted in and an alternative position being shown by dotted lines; Fig. 2 is a plan view; and Fig. 3 is a cross-sectional view on line 3—3 of Fig. 2.

Like parts are indicated by similar characters of reference throughout the different figures.

The land rolling machine illustrated includes a truck frame whose forward and rear ends 4, 5 are in the form of shafts upon which the outer, or forward and rear, cylindrical rollers 6, 7 are adapted to rotate while the sides 8 of said truck frame serve not only to maintain the front and rear rollers in proper relationship but also act to support the pivot 9 of a lever mechanism 10 that carries a shaft 11 for the intermediate cylindrical roller 12, this shaft being located to one side of the fulcrum. The lever device 10 is provided with a handle 13 which carries a pin 14 adapted for engagement with the holes in a holding rack 15, a spring 16 forcing the pin into engagement with any rack hole in register therewith. By pressing downwardly upon and lowering the handle, the forward end of the truck is raised, this end of the truck carrying upwardly with it the forward roller 6, the two other rollers remaining upon the ground owing to the construction illustrated but to which I do not wish to be limited. After the forward roller has been elevated to a position in which the pin 14 engages a lower hole in the retaining rack, the handle 13 may be elevated slightly to lower the forward roller 6 and raise the rear roller 7 in which readjustment the entire load is borne by the intermediate roller. The truck frame also preferably carries a receptacle 17 for rocks or other heavy material to reinforce the inherent weight of the rollers, and in order that the machine may more readily be turned when the front and rear rollers are off the ground, the intermediate roller is divided into two independently rotatable sections or divisions.

I have selected a simple and comparatively small embodiment of my invention in order that the invention might be very easily comprehended and I have omitted a power plant from the illustration of the invention as such may readily be supplied if it is desired to operate the rolling machine by power if, for example, such machine is made on a much larger scale. I do not therefore wish to be limited to the very simple structure illustrated nor to a land rolling machine which is propelled or pushed by means other than power driven mechanism. Nor do I wish to be limited, in all embodiments of the invention, to a structure wherein the axis of the intermediate roller is adjustable with respect to the axes of the end rollers for there are important advantages in the machine of my invention whether or not the axes of the intermediate and end rollers are relatively adjustable. These advantages will now be set forth.

When the three rollers are in working position the peripheral portions thereof that are in contact with the ground or are nearest to the ground lie in the same plane owing to the relative fixedness of the axes of the three rollers and this result is obviously obtainable whether or not the three rollers are of uniform diameter so long as the framework is such as to maintain the axes of the rollers in the required fixed or substantially fixed relationship. By having the peripheral portions of the rollers that are closest to the ground occupy substantially the same plane the following results occur under the circumstances to be recited. Assuming that the roller is traveling in a direction in which the handle 13 is at the rear, let it be supposed that the forward roller strikes a rise in the ground. The intermediate roller will then be raised and the weight of the machine will be transferred to the ground through the forward and rear rollers. The middle roller will next strike the rise in the ground providing this rise has not been eliminated by the forward roller and the weight of the machine will be transferred to the ground mainly through the intermediate roller further to reduce the rise, or entirely eliminate it if such is then possible. If the rise in the ground is yet not eliminated the rear roller will next strike it and the weight of the machine will again be transferred to the ground through the forward and rear rollers. Thus the end rollers take lighter part in reducing the elevations and the middle roller takes a heavier part in reducing the elevations so that there is included in one machine the capacities of two rolling machines that are comparatively light and heavy.

As the machine is moved over the ground the high points of the ground receive the weight of the machine which is transferred in a manner that has been described and with results that are obviously satisfactory in a land rolling process. Other conditions of the land could be recited upon which the rolling machine operates but further description of the operation of the machine will not be required as the results would be obvious to those familiar with land rolling machines.

While I have shown a machine wherein the axes of the end rollers may be elevated with respect to the axis of the intermediate roller, I do not wish to be limited to a machine in which such relative adjustment of the roller axes may be secured nor do I wish to be limited to the minimum number of three rollers.

Having thus described my invention I claim as new and desire to secure by Letters Patent the following:

1. A land rolling machine including three land rolling rollers arranged in tandem; a mounting for said rollers serving normally to hold the axes thereof in substantially fixed relation and in such relative position as to have the peripheral portions of the rollers nearest the ground occupy substantially the same plane; and mechanism for effecting the elevation of an outer roller while the intermediate roller remains upon the ground to permit the outer rollers to be lifted from the ground while the intermediate roller remains upon the ground, said intermediate roller being separated into two independently rotatable divisions to enable the machine readily to turn when the outer rollers are elevated.

2. A land rolling machine including three land rolling rollers arranged in tandem; a mounting for said rollers serving normally to hold the axes thereof in substantially fixed relation and in such relative position as to have the peripheral portions of the rollers nearest the ground occupy substantially the same plane; and mechanism for effecting the elevation of an outer roller while the intermediate roller remains upon the ground to permit the outer rollers to be lifted from the ground while the intermediate roller remains upon the ground.

In witness whereof, I hereunto subscribe my name this 25th day of November A. D., 1910.

CHARLES L. LILLEBERG.

Witnesses:
G. L. CRAGG,
GEO. C. DAVISON.